United States Patent
Shah et al.

(10) Patent No.: US 11,966,699 B2
(45) Date of Patent: Apr. 23, 2024

(54) INTENT CLASSIFICATION USING NON-CORRELATED FEATURES

(71) Applicant: International Business Machines Corporation, Armonk, NY (US)

(72) Inventors: Abhishek Shah, Jersey City, NJ (US); Ladislav Kunc, Cambridge, MA (US); Haode Qi, Cambridge, MA (US); Lin Pan, Acton, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 17/350,116

(22) Filed: Jun. 17, 2021

(65) Prior Publication Data

US 2022/0405472 A1    Dec. 22, 2022

(51) Int. Cl.
| | | |
|---|---|---|
| *G06F 40/30* | (2020.01) | |
| *G06F 16/33* | (2019.01) | |
| *G06F 16/35* | (2019.01) | |
| *G06F 40/284* | (2020.01) | |
| *G06N 5/04* | (2023.01) | |
| *G06N 20/00* | (2019.01) | |

(Continued)

(52) U.S. Cl.
CPC ........ *G06F 40/284* (2020.01); *G06F 16/3344* (2019.01); *G06F 16/355* (2019.01); *G06N 5/04* (2013.01); *G06N 20/00* (2019.01); *G10L 15/1822* (2013.01); *G06F 40/263* (2020.01); *G06F 40/279* (2020.01); *G06F 40/295* (2020.01); *G06F 40/53* (2020.01)

(58) Field of Classification Search
None
See application file for complete search history.

(56) References Cited

U.S. PATENT DOCUMENTS 6,076,051 A  *  6/2000  Messerly .......... G06F 16/3344
                                                   707/999.005
8,478,749 B2 *  7/2013  Edala ................... G06F 16/951
                                                   707/723

(Continued)

FOREIGN PATENT DOCUMENTS

CN      103309926 A      9/2013
CN      105243055 B      1/2016

(Continued)

OTHER PUBLICATIONS

English translation of JP2004-258759 A. (Year: 2004).*

(Continued)

*Primary Examiner* — Richard Z Zhu
(74) *Attorney, Agent, or Firm* — David K. Mattheis

(57) ABSTRACT

A system for classifying a language sample intent by receiving a language sample including a set of features, identifying language sample features, determining a tokenization score for the language sample according to the language sample features, eliminating duplicate features according to the tokenization score, determining a term frequency (tf) according to the identified features and the tokenization score, determining an inverse document frequency (idf) according to the identified features and the tokenization score, and generating a term frequency-inverse document frequency (tf-idf) matrix for the identified features.

20 Claims, 4 Drawing Sheets

(51) Int. Cl.
*G10L 15/18* (2013.01)
*G06F 40/263* (2020.01)
*G06F 40/279* (2020.01)
*G06F 40/295* (2020.01)
*G06F 40/53* (2020.01)

(56) References Cited

U.S. PATENT DOCUMENTS

| | | | |
|---|---|---|---|
| 9,208,134 B2 | 12/2015 | Alkharashi | |
| 9,740,987 B2* | 8/2017 | Dolan | G06N 20/00 |
| 10,528,407 B2* | 1/2020 | Basavarajappa | G06F 11/079 |
| 10,606,931 B2* | 3/2020 | Wick | G06F 40/295 |
| 11,288,453 B1* | 3/2022 | Vinicombe | G06F 40/284 |
| 11,392,772 B2* | 7/2022 | Wang | G06F 8/73 |
| 2013/0179147 A1 | 7/2013 | Alkharashi | |
| 2018/0365207 A1 | 12/2018 | Saetrom | |
| 2019/0026174 A1* | 1/2019 | Basavarajappa | G06F 11/0709 |
| 2019/0354574 A1* | 11/2019 | Wick | G06N 5/04 |
| 2020/0265185 A1* | 8/2020 | Kargiannakis | G06N 5/046 |
| 2021/0191798 A1* | 6/2021 | Zhang | G06F 11/3476 |
| 2022/0058342 A1* | 2/2022 | Fan | G06N 5/04 |
| 2022/0284045 A1* | 9/2022 | Saha | G06F 11/0778 |
| 2022/0319646 A1* | 10/2022 | Mukherjee | G06F 40/174 |
| 2022/0343072 A1* | 10/2022 | Ogren | G06N 20/00 |

FOREIGN PATENT DOCUMENTS

| | | |
|---|---|---|
| CN | 106528536 A | 3/2017 |
| CN | 107797986 B | 3/2018 |
| CN | 107894976 A | 4/2018 |
| CN | 107992467 A | 5/2018 |
| CN | 107992475 A | 5/2018 |
| JP | 2004258759 A * | 9/2004 |
| JP | 2011118496 A | 8/2014 |

OTHER PUBLICATIONS

Panunzi et al., "Multi-Term keywords for indexing multilingual textual repositories: developing language resources and algorithms", Proceedings of the Second International Conference on automated production of cross media content for multi-channel distribution, 2006. (Year: 2006).*

Sakthi et al., "Text pre-processing methods on cross language information retrieval", International Conference on Connected Systems & Intelligence (CSI), 2022. (Year: 2022).*

Grace Period Activities Transmittal, filed herewith, 1 page.

Kudo et al., "SentencePiece: A simple and language independent subword tokenizer and detokenizer for Neural Text Processing", Proceedings of the 2018 Conference on Empirical Methods in Natural Language Processing (System Demonstrations), pp. 66-71 Brussels, Belgium, Oct. 31-Nov. 4, 2018. c 2018 Association for Computational Linguistics, <https://www.aclweb.org/anthology/D18-2012.pdf>.

Mell et al., "The NIST Definition of Cloud Computing", National Institute of Standards and Technology, U.S. Department of Commerce, NIST Special Publication 800-145, Sep. 2011, 7 pages.

Sennrich et al., "Neural Machine Translation of Rare Words with Subword Units", arXiv:1508.07909v5 [cs.CL] Jun. 10, 2016, 11 pps., <https://arxiv.org/pdf/1508.07909.pdf>.

* cited by examiner

INTENT CLASSIFICATION USING NON-CORRELATED FEATURES

STATEMENT REGARDING PRIOR DISCLOSURES BY THE INVENTOR OR A JOINT INVENTOR

The following disclosure(s) are submitted under 35 U.S.C. § 102(b)(1)(A): DISCLOSURE(S):

1.) David K. Mattheis, May 12, 2021. Grace Period Activities Transmittal.

FIELD OF THE INVENTION

The disclosure relates generally to the classification of intents for language analysis systems. The disclosure relates particularly to methods and systems using non-correlated features for intent classification across multiple languages.

BACKGROUND

Pre-processing text in intent classification technology is known for the purpose of improving the accuracy, efficiency and scalability of the classification. The non-exclusive set of pre-processing methods involve text normalization, tokenization, lemmatization, stemming, chunking, etc. Most of these techniques are very language dependent and focused on the characteristics of languages like morphology, bi-directionality of the script in which the language is read/written and case sensitivity/insensitivity. The quality of the extracted features used in downstream language processing tasks such as intent classification, depends upon the specific steps of the text preprocessing such as tokenization and word segmentation.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the classification of language sample intents across multiple languages.

Aspects of the invention disclose methods, systems and computer readable media associated with classifying a language sample intent by receiving a language sample including a set of features, identifying language sample features, determining a tokenization score for the language sample according to the language sample features, eliminating duplicate features according to the tokenization score, determining a term frequency (tf) according to the identified features and the tokenization score, determining an inverse document frequency (idf) according to the identified features and the tokenization score, and generating a term frequency-inverse document frequency (tf-idf) matrix for the identified features.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
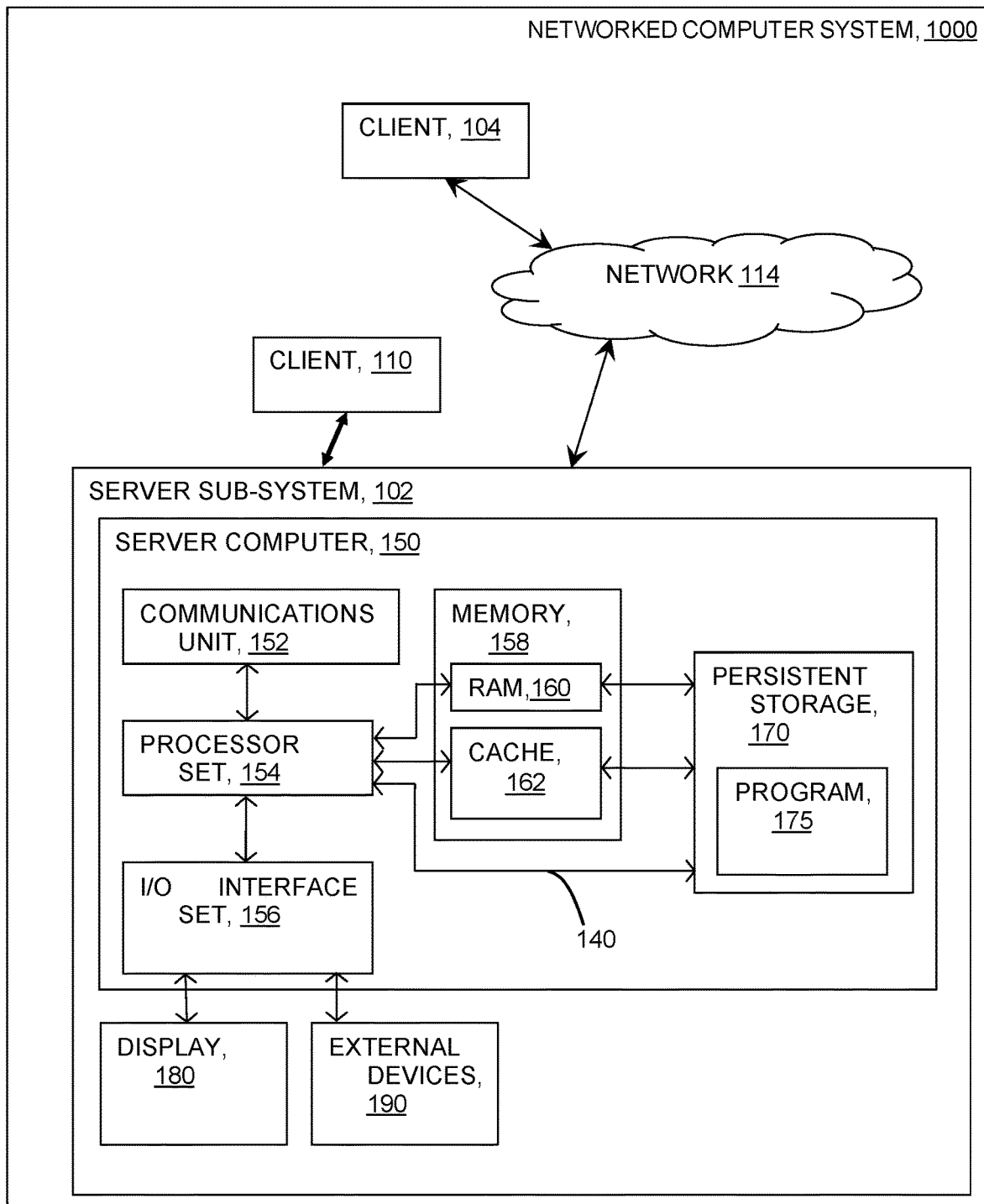
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Chatbot intent classification text processing tasks are especially challenging. The consistency of extracted features across language samples is important in this field where end-users of chatbots communicate using a free form language. This language contains typographic errors, very short sentences with abbreviations, and many times it isn't even grammatically correct. On the other hand, the chatbot training sets contain mostly grammatically correct and clean data.

The language sample tokenization step involves splitting the sentences, phrase or group of sentences or phrases of the language data sample into tokens, or terms, that can be then translated into sets of features in a distributional semantic space. Many clients seek to develop chatbots in different languages and it becomes difficult to scale tokenization technique across multiple languages. Moreover, a lot of clients use code-mixed texts in the training data for intent classification, mixtures of symbols and words combinations of languages.

Tokenization is an essential step in pre-processing text to extract the useful features for intent classification. The tokenization technique selected depends heavily on the dataset language for which the intent classification system is designed. Different types of tokenization techniques have been used for languages that use scripts where words are split by white spaces. "White-space tokenization" where words separated by white spaces are separated into individual tokens. Various punctuation characters, along with white spaces, can also be used to affect the word segmentation and these segments are ultimately a source for feature extraction to a common semantic space. This technique is fairly common in European languages or other languages that belong to Indo-Aryan family tree of languages where words are easily distinguished.

There are languages like Chinese and Japanese, where the words, or the symbols, are not separated by white spaces and hence the white-space tokenizers can't be used for such languages. Also, particularly in South Asian countries, it's a very common practice to mix multiple languages (i.e. English words with Chinese characters) in one sentence, especially in the digital world. Thus, clients that use chatbots as a communication channel to create code-mixed training data for training the chatbots. It therefore becomes challenging to use appropriate tokenizers for training chatbots with code-mixed data. Disclosed embodiments enable a tokenization technique that can be scaled across multiple languages, and thus be language agnostic and easily maintainable in production settings for intent classification purposes, and can extract compact set of high quality and consistent features from text and thereby increases the efficiency of text classification for creating and training chatbots. Disclosed embodiments enable the extraction of features using efficient, scalable and easy to maintain tokenization techniques across different languages. Embodiments extract compact sets of non-correlated features in a language agnostic classification setting, and also support the use of training data which contains text with mixed set of characters and/or words from multiple languages.

Solving the tokenization/featurization/classification issue efficiently in morphologically rich languages involves several techniques that are popular because of the simplicity of their training and accuracy. Unsupervised techniques like Byte Pair Encoding (BPE) employs a data compression algorithm to generate the byte representations of frequently used byte sequences in the data for segmentation. BPE starts with character symbols and then iteratively merges the symbols identified in the previous iteration. This method is constrained by the number of allowed merges. Following this line of work, a new technique called SentencePiece maps the tokens to unique identifiers. The mapping is constrained by a pre-selected vocabulary size, which is generally easy to operate as it directly corresponds to a number of text surface-level features used for planned downstream tasks. These techniques may be used even for languages such as Chinese and Japanese, that don't follow white-space based tokenization.

Each of white-space tokenization and SentencePiece tokenization have advantages and limitations. White-space tokenization, or any language specific tokenization, may contain important lexical and semantic information that's encoded in the words but that are very language specific. The tokens obtained by unsupervised methods such as byte pair encoding (BPE) and SentencePiece, loose the lexical and semantical importance of a token (and the human natural appearance of tokens) in a given sentence. At the same time, such tokens are very easy to obtain without knowing the underlying linguistic properties of the language and one can generate the representation only with textual corpus in a specific language. Such techniques are scalable across multiple languages, but have a tendency to decompose natural words. It's mainly visible in Latin-script languages where they produce two or more partial tokens out of one natural token. This is a needed property for domains like statistical machine translation where a reasonably small feature vocabulary is needed for vast amount of data. However, it isn't suitable for tasks like intent classification for a chatbot domain where there is a tendency to deal with much smaller training datasets and a desire to keep the input noise of tokenization minimal.

For example, a very common feature used in an intent classification task is an entity mention match in the sentence. The entity mention matches are words, or sequences of words, which are used for direct entity matches while developing chatbots. So, if "login" is involved as one of the entities, SentencePiece like techniques can further split "login" into "log" and "in" in some specific contexts and essentially the system will fail to recognize this entity. Or the other way around, if a user defines another entity value "log", then this entity could be matched in the word "login" based on the SentencePiece split, creating a false positive match. This raises the issue of consistency. A problem with learnt word segmentations is that they could depend on context and segment input sentences differently if the word stands alone or is part of longer sentence.

To overcome the limitations of both the above techniques, disclosed embodiments include a framework able to ingest a hybrid set of features obtained from both white-space tokenizers and unsupervised tokenizers, and weight them based on the proportion of the language present in the training data, by character identification, with a language identification system, or by some other more general recognition algorithm. Embodiments involve generating the ensemble of white-space tokenization and unsupervised tokenization, such as SentencePiece. Embodiments determine whether the sample languages follow white-space tokenization by the proportion of spaces as compared to other tokens and/or based on average length of tokens that would be created by simple white-space tokenization.

For most of the languages, based on unicode character identification and the words itself, we can predetermine the language of the input text and then apply an appropriate tokenization method on it. Taking confidence scores from the language identification phase into account when dealing with mixed and sparse textual data. More specifically, for a given statistical classifier method, disclosed methods obtain tokens from both the tokenization schemes and translate the tokens into feature sets. Methods re-weight the feature sets based on the proportion of the types of tokens obtained. From a tokenization perspective, methods consider three sets of conditions based on languages in intent classification: 1. white-space tokenization applies (for example English) 2. no white-space tokenization (for example Chinese) and 3. code-mixed text (for example English+Chinese). The weighting scheme applies effectively to different granularities, e.g., the overall length of a sentence, and specific parts of a sentence (code-mixed text).

Aspects of the invention provide an improvement in the technical field of automated conversation (chatbot) systems. Chatbot systems utilize natural language processing (NLP), to analyze user inputs and determine a user's intent in order to select an appropriate response. Analyzers utilize token frequency and other additional features in determining intent. For some languages, analyzers also use segmentation, morphology, and other language specific information in support of the tokenization process. Common NLP systems may not support all languages and the segmentation, morphology, and other language information may not be available for use in support of the tokenization. Disclosed embodiments enable tokenization for use in determining intents in a linguistic agnostic manner, without a need for the additional language specific information.

Aspects of the invention also provide an improvement to computer functionality. In particular, implementations of the invention are directed to a specific improvement to the way chatbot systems operate, analysis of input text using each of white-space and unsupervised tokenization methods occurs in parallel, providing a superior tokenization of input text without any adverse impact upon computing system performance.

As an overview, a classification system receives input text associated with a target language fora chatbot or other use. In an embodiment, the system and method identify the language of the input text and a probability associated with the identification. The method extracts whitespace-separated tokens and statistics regarding the white-space tokenization of the input text such as the length of the whitespace-separated tokens and the proportion of the white spaces to the overall text of the input text sample. The method and system also perform an unsupervised tokenization on the sample, such as SentencePiece tokenization, obtaining the SentencePiece tokens. The method determines term frequency (tf), the number of times a word appears in a document, and inverse document frequency (idf), the inverse of the number of documents of the corpus in which the word appears, for the identified tokens from each method. At runtime, the method determines tf for each term in the input sample, and the method looks up the idf value for each term from the idf values calculated for terms within the training data set. The method constructs a tf-idf matrix for the identified tokens using token frequency within the input text. Matrix entries include tf-idf values for the identified tokens. In an embodiment, the method identifies features, determines a tokenization score, determines tf and idf, and generates the tf-idf matrix without identifying the language of the received language sample.

In an embodiment, the method determines a probability of using white-space tokenizer (PWST) according to the identified language probability, the white-space to character ratio, the average white-space token length, and other applicable data points for the input text. The method assigns new weights to the tf-idf matrix entries according to the determined PWST for the identified language. In an embodiment, the method modifies the value of PWST as more input text associated with the target language according to the processing of additional target language input texts.

The method compares the white-space tokens and the unsupervised tokens, identifying duplicate tokens across the two sets. In an embodiment, the method then eliminates the duplicate tokens from one of the white-space or unsupervised token sets, according to the PWST, a higher PWST values results in elimination of duplicate tokens from the unsupervised set of tokens, while a low PWST results in elimination of duplicate tokens from the white-space set of tokens. Tf-idf matrix entries may change again after elimination of duplicate tokens based upon PWST. In an embodiment, the method addresses duplicate tokens by re-weighting selected duplicates to a weight of zero, effectively eliminating the tokens from the tf-df matrix. The method provides a trained tf-idf matrix weighted using the PWST value, for use in tokenizing input text for further downstream processing such as intent classification using an NLP algorithm.

In an embodiment, one or more components of the system can employ hardware and/or software to solve problems that are highly technical in nature (e.g., receiving a language sample including a set of features, identifying the language, identifying language sample features, determining a tokenization score for the language sample according to the language and the identified features, eliminating duplicate features according to the tokenization score, determining a term frequency (tf) according to the identified features and the tokenization score, determining an inverse document frequency (idf) according to the identified features and the tokenization score, generating a term frequency-inverse document frequency (tf-idf) matrix for the identified features, classifying an intent of the language sample according to the tf-idf matrix, etc.). These solutions are not abstract and cannot be performed as a set of mental acts by a human due to the processing capabilities needed to facilitate language sample intent classification, for example. Further, some of the processes performed may be performed by a specialized computer for carrying out defined tasks related to the classification of language sample intents. For example, a specialized computer can be employed to carry out tasks related to the classification of a language sample intent, or the like.

In an embodiment, systems and methods utilize a tf-idf matrix trained using a target language data set and a PWST determined for the target language. During an inference or production phase, the method receives input text, the input text includes a set of features including words, symbols, punctuation, and white spaces between words, punctuation, and/or symbols. The method identifies tokens in the input text and translates the identified tokens into tf-idf matrix entries used to obtain weights for the features of the input text. The resulting set of weights may be passed as an output to a downstream statistical analyzer for purposes such as classifying an intent of the input text.

In an embodiment, the method first passes the input text to a language identification system. The language identification system includes one or more language identification algorithms which estimate probabilities (confidence scores) of the input being a particular language according to comparison of input text characteristics, such as the Unicode characters, and language specific words of the input text tokens and the language characteristics of multiple languages found in the training data used for the language identification system, in an embodiment, the method also compares the proportion of white spaces and the average length of the white-space tokens of the input text and those multiple language training data set. characteristics of the multiple languages of the training data set. For each language the method defines a probability of using a white-space tokenizer score. English has a PWST score of one, while Chinese has a PWST of zero. In this embodiment, the method determines a PWST for the input text as the highest confidence score of the language identification system times the PWST for the language having that score. As an example, a language identification system output of 60% English has a final PWST for the input text of 60%*1=60%. In an embodiment, the method determines PWST using the average token length and white space proportions of the language sample without regard for language identification confidence scores.

In an embodiment, the method calculates PWST using to the function PWST=lang_id_weight*lang_id_pwst+token_length_weight*average_token_length_pwst where lang_id_weight+token_length_weight=1. In this embodiment, for instance where the method does not identify the language, token_length_weight=1.

In an embodiment, the method applies both white-space tokenization and unsupervised tokenization such as SentencePiece, to the input text. For the sets of tokens, the method determines tf and idf values. The method translates those values into a tf-idf matrix for the input text, according to their frequency. The method then compares the two sets of tokens and identifies duplicate tokens among the two sets. The method eliminates duplicate tokens according to a tokenization score based upon the PWST of the input text. In an embodiment, for PWST scores>50%, the method eliminates the duplicate SentencePiece tokens. For PWST<50%, the method eliminates duplicate white space tokens. After eliminating duplicates, the method revises the tf-idf matrix frequency values for the input text using the set of tokens absent the duplicates. The method also applies the PWST for the input text to the tf-idf weights for the input text generating a re-weighted tf-idf matrix for the input text. The method then passes the output of the revised tf-idf matrix of the input text to downstream statistical processing systems.

In an embodiment, the method trains the language identification system using a training data set including labeled language samples from a multitude of languages. For each language sample, the method extracts language characteristics including Unicode characters, language specific words, white-space proportions, average token length, and token tf-idf matrix values. At runtime, the method extracts similar characteristics for the input text and compares the input text features with those of the multitude of languages. The method determines a confidence score for each potential language depending upon the degree of matching between the input text features and the language's characteristics from the training data set. During the training phase, the method also determines a PWST score for each of the multitude of languages according to the proportion of white spaces and the average token length for the training data set for each language. In an embodiment, the method updates the PWST for languages as additional language input texts are processed.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server subsystem 102 via network 114. Client devices 104 and 110 comprise language classification application program (not shown) together with sufficient computing resource (processor, memory, network communications hardware) to execute the program. In an embodiment, client devices 104 and/or 110 comprise user interface devices enabling access to the language classification program and providing an interface for a user to provide language samples as input and receive tf-idf matrices as output. As shown in FIG. 1, server subsystem 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the language classification program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., language classification program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
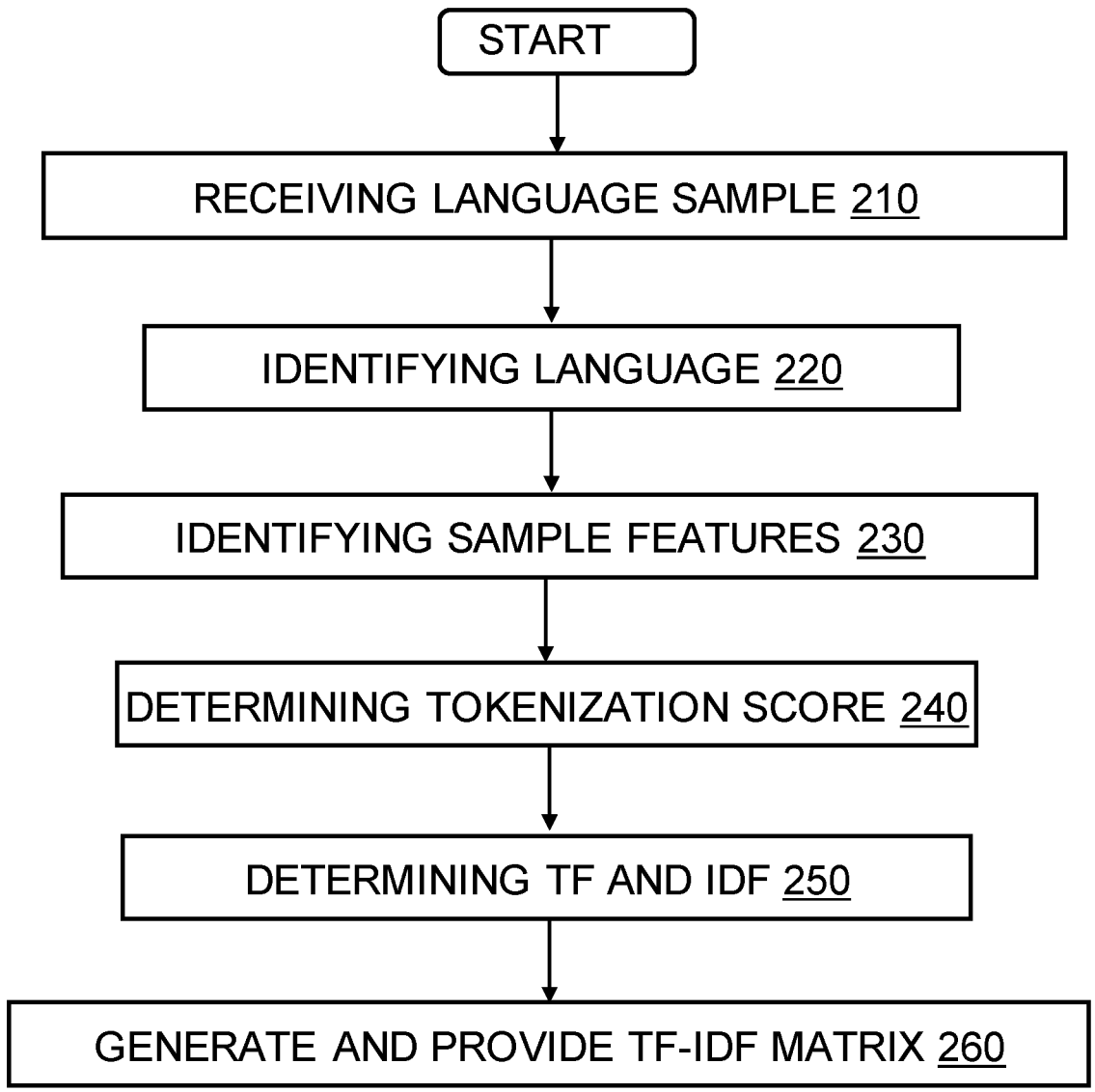
FIG. 2 provides a flowchart depicting an operational sequence, according to an embodiment of the invention.

FIG. 2 provides a flowchart 200, illustrating exemplary activities associated with the practice of the disclosure. After program start, at block 210 the method executing the language classification program using a computing environment such as that of FIG. 1, receives an input language sample, such as a user input or response to a chatbot automatic conversation system. The input includes text from one or a combination of languages. The method seeks to classify the input text to provide input data for downstream NLP, such as downstream intent classification of the input text. Use cases for the application of disclosed systems and methods and the tf-idf matrices include contextual entity recognition, recognizing and classifying hate speech in a received sample, and detecting personal identifying information in a received language sample.

At block 220, the method identifies the language of the received input language sample. In an embodiment, the method compares characters, symbols and/or words of the input language sample in comparison to labeled samples from a training language data set, to identify the language of the input. In an embodiment, the output of an identification system includes an identified language together with a confidence level for the identification. In an embodiment, the disclosed methods output includes characterization of the features of a received language sample. In an embodiment, the method skips the step of identifying the language of the sample and proceed with steps characterizing the features of the received language sample without identifying the language of the sample.

At block 230, the method identifies features of the input sampler, features such as tokens of the sample. In an embodiment, the method applies white-space and unsupervised tokenizers to the language sample to derive sets of tokens for the sample.

At block 240, the method assigns a probability of white-space tokenization (PWST) for the identified language based upon the PWST associated with the labeled training data for the language, the average token length of the sample and the white space proportions of the sample.

At block 250, the method determines term frequency and inverse document frequencies for the tokens of the input sample. The method determines baseline tf and idf values and then modifies those values according to the PWST assigned according to the identified language.

At block 270, the method generates a tf-idf matric according to the modified tf-idf values for the identified features/tokens of the input sample. The modified tf-idf matrix represents a classification of the input sample as each distinct input sample has a unique modified tf-idf matrix for its unique set of tokens. The method provides the tf-idf matrix of PWST modified token frequency values for further use by downstream statistical analyzers, such as NLP intent classifiers.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Embodiments may be executed using local computing environment resource, local networked computing resources as well as edge cloud or cloud computing resources to enable more efficient processing of the input samples and the training of the classification model(s).

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
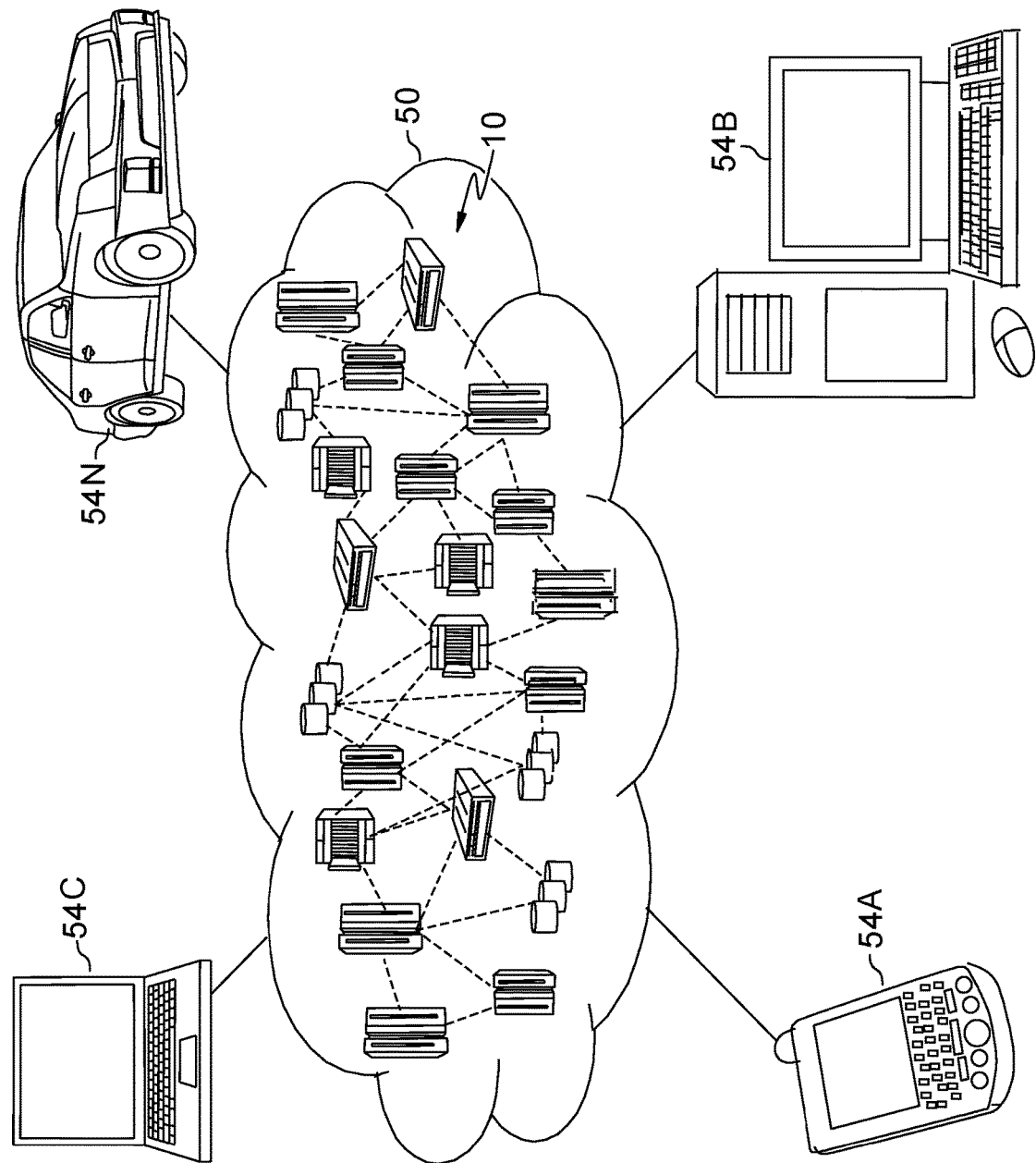
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
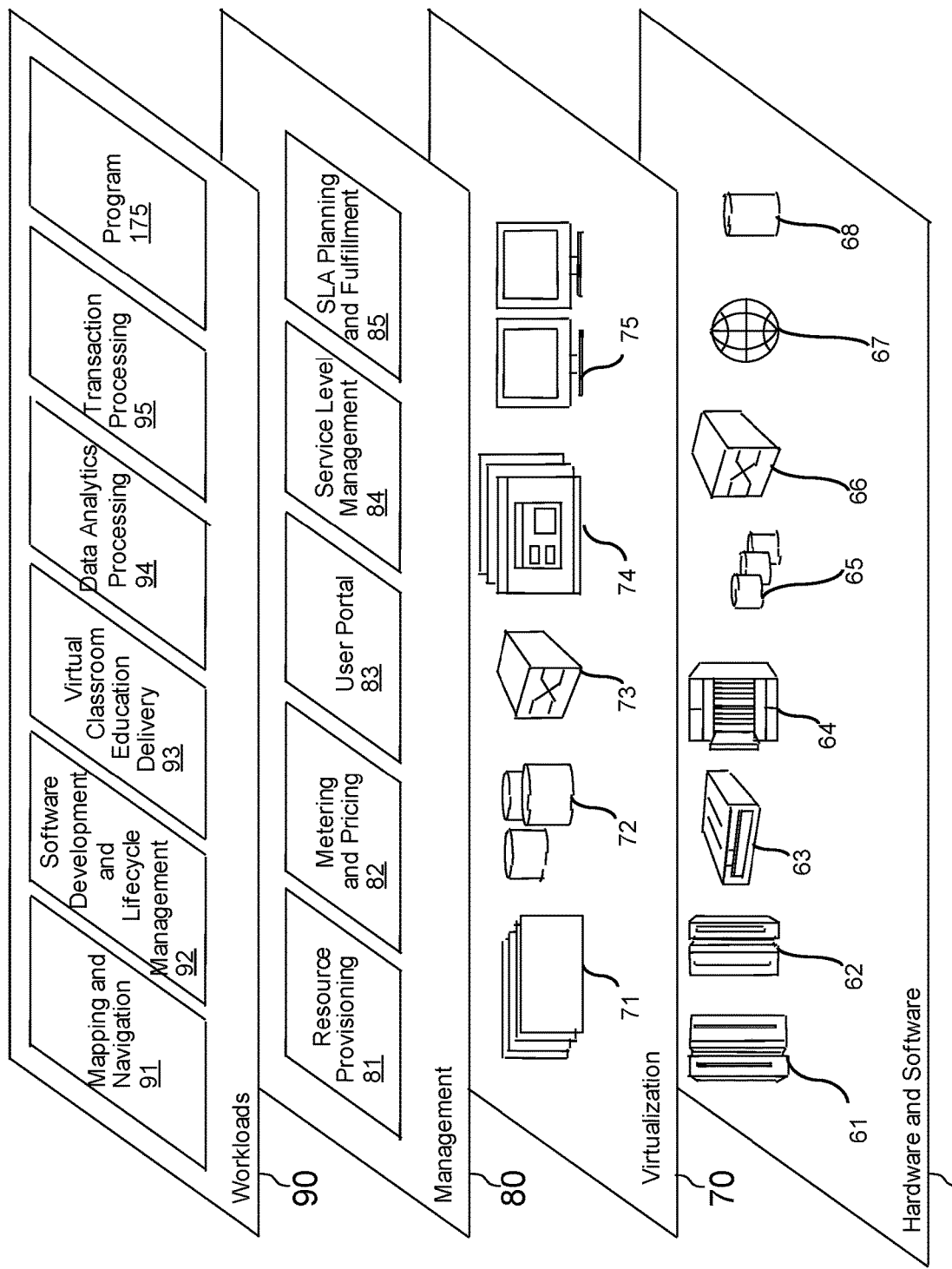
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and language classification program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system comprising computer processors to implement a method for classifying a language sample, the computer system comprising:
   one or more computer processors;
   one or more computer readable storage devices;
   stored program instructions on one or more computer readable storage devices for execution by the one or more computer processors, the stored program instructions comprising:
   program instructions to train a term frequency-inverse document frequency (tf-idf) matrix using a training data set including labeled language samples for multiple languages by:
   extracting language characteristics for each language sample,
   determining a probability of using white-space tokenizer (PWST) score for each language,
   training weights of a tf-idf matrix for each language according to the PWST and language characteristics for each language,
   program instructions to receive a first language sample comprising a set of features;
   program instructions to identify language sample features of the first language sample;
   program instructions to determine a tokenization score for the first language sample according to the language sample features;

program instructions to determine a term frequency (tf) according to the identified language sample features and the tokenization score;
program instructions to determine an inverse document frequency (idf) according to the identified language sample features and the tokenization score;
program instructions to generate a revised term frequency-inverse document frequency (tf-idf) matrix for the identified language sample features using the trained tf-idf matrix, the tf, and the idf;
program instructions to receive input text;
program instructions to identify tokens in the input text; and
program instructions to translate the tokens into entries in the revised term frequency—inverse document frequency (tf-idf) matrix to classify an intent of the input text.

2. The computer system according to claim 1, the stored program instructions further comprising program instructions to identify the language according to language characteristics, white-space proportions, and average token length; and
program instructions to determine the tokenization score according to the language and the language features.

3. The computer system according to claim 1, wherein determining a tokenization score for the language sample according to the language comprises determining a tokenization score according to information including a white-space proportion estimate and an average token length.

4. The computer system according to claim 1, the stored program instructions further comprising program instructions to eliminate duplicate features according to the tokenization score.

5. The computer system according to claim 4, wherein eliminating duplicate features comprises keeping white-space features for a high tokenization score.

6. The computer system according to claim 4, wherein eliminating duplicate features comprises keeping sentencepiece features for a low tokenization score.

7. The computer system according to claim 1, the stored program instructions further comprising program instructions to train a language sample classifier according to training sample features and tokenization scores.

8. A method for classifying a language sample, the method comprising:
training, by one or more computer processors, a term frequency-inverse document frequency (tf-idf) matrix using a training data set including labeled language samples for multiple languages by:
extracting language characteristics for each language sample, determining a probability of using white-space tokenizer (PWST) score for each language,
training weights of a tf-idf matrix for each language according to the PWST and language characteristics for each language,
receiving, by the one or more computer processors, a first language sample comprising a set of features;
identifying, by the one or more computer processors, language sample features of the first language sample;
determining, by the one or more computer processors, a tokenization score for the first language sample according to the language sample features;
determining, by the one or more computer processors, a term frequency (tf) according to the identified language sample features and the tokenization score;
determining, by the one or more computer processors, an inverse document frequency (idf) according to the identified language sample features and the tokenization score;
generating, by the one or more computer processors, a revised term frequency—inverse document frequency (tf-idf) matrix for the identified language sample features using the trained tf-idf matrix, the tf and the idf;
receiving, by the one or more computer processors, input text;
identifying, by the one or more computer processors, tokens in the input text; and
translating, by the one or more computer processors, the tokens into entries in the revised term frequency—inverse document frequency (tf-idf) matrix to classify an intent of the input text.

9. The method according to claim 8, further comprising identifying, by the one or more computer processors, the language according to language characteristics, white-space proportions, and average token length; and
determining, by the one or more computer processors, the tokenization score according to the language and the language features.

10. The method according to claim 8, wherein determining a tokenization score for the language sample according to the language comprises determining a tokenization score according to information including a white-space proportion estimate and an average token length.

11. The method according to claim 8, further comprising eliminating, by the one or more computer processors, duplicate features according to the tokenization score.

12. The method according to claim 11, wherein eliminating duplicate features comprises keeping white-space features for a high tokenization score.

13. The method according to claim 11, wherein eliminating duplicate features comprises keeping sentencepiece features for a low tokenization score.

14. The method according to claim 8, further comprising training, by the one or more computer processors, a language sample classifier according to training sample features and tokenization scores.

15. A computer program product for classifying a language sample, the computer program product comprising one or more computer readable storage devices and collectively stored program instructions on the one or more computer readable storage devices, the stored program instructions comprising:
program instructions to train a term frequency-inverse document frequency (tf-idf) matrix using a training data set including labeled language samples for multiple languages by:
extracting language characteristics for each language sample,
determining a probability of using white-space tokenizer (PWST) score for each language,
training weights of a tf-idf matrix for each language according to the PWST and language characteristics for each language,
program instructions to receive a first language sample comprising a set of features; program instructions to identify language sample features of the first language sample;
program instructions to determine a tokenization score for the first language sample according to the language sample features;

program instructions to determine a term frequency (tf) according to the identified language sample features and the tokenization score;

program instructions to determine an inverse document frequency (idf) according to the identified language sample features and the tokenization score;

program instructions to generate a revised term frequency—inverse document frequency (tf-idf) matrix for the identified language sample features using the trained tf-idf matrix, the tf, and the idf;

program instructions to receive input text;

program instructions to identify tokens in the input text; and program instructions to translate the tokens into entries in the revised term frequency—inverse document frequency (tf-idf) matrix to classify an intent of the input text.

16. The computer program product according to claim 15, the stored program instructions further comprising program instructions to identify the language according to language characteristics, white-space proportions, and average token length; and program instructions to determine the tokenization score according to the language and the language features.

17. The computer program product according to claim 15, wherein determining a tokenization score for the language sample according to the language comprises determining a tokenization score according to information including a white-space proportion estimate and an average token length.

18. The computer program product according to claim 15, the stored program instructions further comprising program instructions to eliminate duplicate features according to the tokenization score.

19. The computer program product according to claim 18, wherein eliminating duplicate features comprises keeping white-space features for a high tokenization score.

20. The computer program product according to claim 18, wherein eliminating duplicate features comprises keeping sentencepiece features for a low tokenization score.

* * * * *